J. W. Strange,
Saw Teeth.
N°. 67,682.       Patented Aug. 13, 1867.
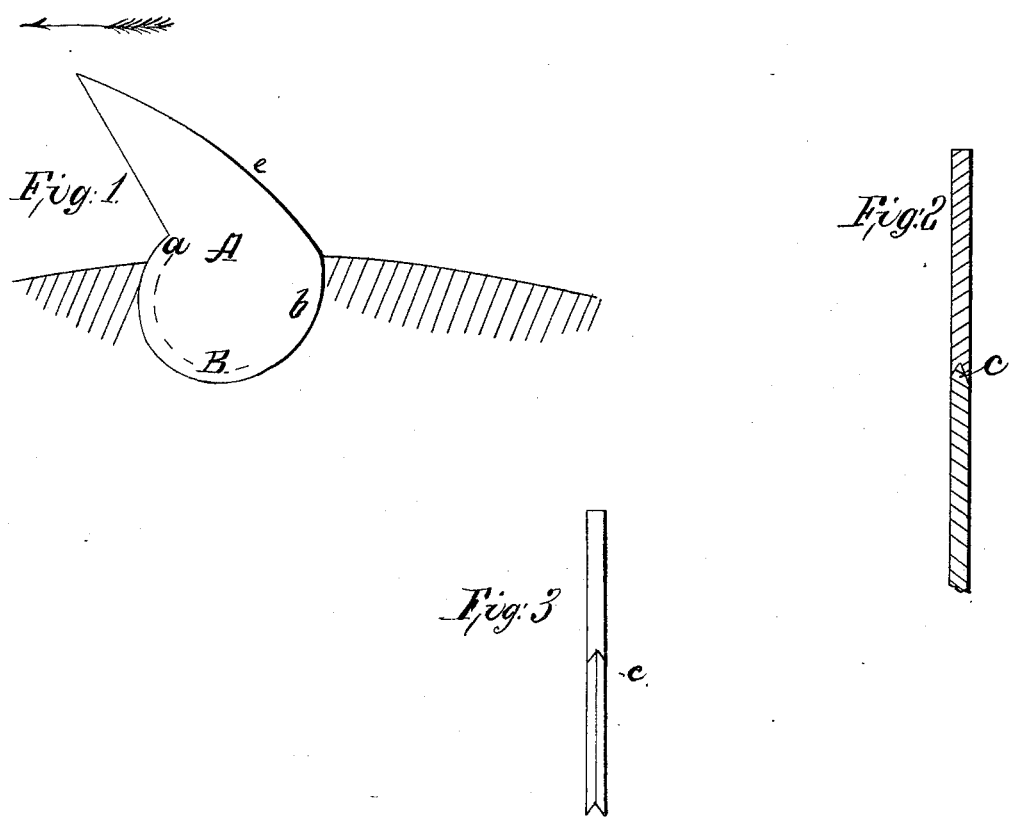
Witnesses.
William H Cliffra
Henry C. Houston
Inventor.
Joseph W. Strange

UNITED STATES PATENT OFFICE.

JOSEPH W. STRANGE, OF BANGOR, MAINE.

IMPROVED INSERTIBLE SAW-TOOTH.

Specification forming part of Letters Patent No. 67,682, dated August 13, 1867.

*To all whom it may concern:*

Be it known that I, JOSEPH W. STRANGE, of Bangor, in the county of Penobscot and State of Maine, have invented a new and Improved Adjustable Saw-Tooth for Circular Saws; and I hereby declare the following to be a full, clear, and exact description thereof, which will enable others to make and use my invention, reference being had to the accompanying drawings, forming part of this specification, in which—

Figure 1 shows a fragment of a circular saw, with my improved tooth set therein; Fig. 2, an edge view of the front or cutting edge of the same; Fig. 3, a view of the back of the same.

My invention consists of a curved or rounded bottom to a saw-tooth, in combination with a rounded recess in a saw-plate, so arranged that the pressure upon the edge of the tooth in sawing serves to hold the tooth firmer in the plate.

A shows a tooth having the curved bottom or lower end B. This is fitted into the curved or rounded recess in the saw-plate. By reason of the peculiar form of the curved bottom, the collision of the cutting-edges of the teeth against the wood being sawed serves to hold or wedge the teeth firmer in the plate. The curve is more abrupt on the side *a* than on the side *b*, so that the curved bottom is bound at *a* by the curve of the edge of the recess in the plate, and is pushed backward against the other edge at *b*. This change in the curve of both the curved bottom B and the recess into which the bottom is fitted, on the different sides specified, prevents the tooth from being thrown out edgewise. The recess and curved bottom are beveled, as seen at *c*, to prevent a blow sidewise from knocking out a tooth.

A slight blow on the back side *e* of the tooth will throw it out of the plate, and it can again be as easily replaced. Thus a saw-tooth quickly and easily adjustable for the purposes of repair, sharpening, or substitution is obtained, and one that is firmly and securely held in position.

I am aware of Letters Patent No. 49,868, issued to J. E. Emerson September 12, 1865; but I do not claim a curved saw-tooth applied as therein shown, the seat of the tooth having at one end a straight vertical edge and employing a rivet. My invention secures the tooth exclusively by the peculiar form of the curved recess shown in the drawing.

I do not claim inserting a saw-tooth on circular lines; but my invention has relation only to a particular and specified manner of inserting a tooth into a recess in the saw-plate of a peculiar shape, and so that the tooth is only kept secured in its place by the collision of the cutting-edges of the tooth against the lumber sawed, this collision being able to effect such purpose by the peculiar formation of the bottom of the saw-tooth and its recess.

Disclaiming all previous methods of inserting and securing a saw-tooth,

What I do claim, and desire to secure by Letters Patent, is—

The curved or rounded bottom to the tooth, in combination with the recess in the saw-plate, both of the form herein illustrated and described, when the same are employed as a method of wedging the tooth in its plate by the collision of the cutting-edges of the tooth with the lumber to be sawed.

JOSEPH W. STRANGE.

Witnesses:
WILLIAM H. CLIFFORD,
HENRY C. HOUSTON.